United States Patent
Suzuki et al.

(10) Patent No.: US 8,549,874 B2
(45) Date of Patent: Oct. 8, 2013

(54) REFRIGERATION SYSTEM

(75) Inventors: Takanori Suzuki, Osaka (JP); Masatoshi Tomita, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 784 days.

(21) Appl. No.: 12/680,417

(22) PCT Filed: Sep. 16, 2008

(86) PCT No.: PCT/JP2008/002543
§ 371 (c)(1),
(2), (4) Date: Mar. 26, 2010

(87) PCT Pub. No.: WO2009/040997
PCT Pub. Date: Apr. 2, 2009

(65) Prior Publication Data
US 2010/0218549 A1    Sep. 2, 2010

(30) Foreign Application Priority Data

Sep. 28, 2007 (JP) .................................. 2007-253962

(51) Int. Cl.
*F25B 39/02* (2006.01)

(52) U.S. Cl.
USPC .............................. 62/516; 62/259.2; 62/407

(58) Field of Classification Search
USPC ............ 62/516, 404, 238.1, 259.2, 407, 410, 62/519, 506, 3.2, 3.6
See application file for complete search history.

(56) References Cited

U.S. PATENT DOCUMENTS

| | | | | |
|---|---|---|---|---|
| 4,463,569 A | * | 8/1984 | McLarty | 62/3.2 |
| 5,495,721 A | * | 3/1996 | Stueble | 62/121 |
| 6,493,223 B1 | * | 12/2002 | Viswanath et al. | 361/690 |
| 2002/0066283 A1 | * | 6/2002 | Oh et al. | 62/259.2 |

FOREIGN PATENT DOCUMENTS

| | | | |
|---|---|---|---|
| JP | 59-132055 U | * | 9/1984 |
| JP | 60-226640 A | | 11/1985 |
| JP | 60-226641 A | | 11/1985 |
| JP | 62-10551 A | | 1/1987 |
| JP | 63-120018 U | | 8/1988 |
| JP | 63-290337 A | * | 11/1988 |
| JP | 2002-333160 | * | 11/2002 |
| JP | 2002-333160 A | | 11/2002 |
| JP | 2006-226558 A | | 8/2006 |

* cited by examiner

*Primary Examiner* — Frantz Jules
*Assistant Examiner* — Steve Tanenbaum
(74) *Attorney, Agent, or Firm* — Birch, Stewart, Kolasch & Birch, LLP

(57) ABSTRACT

A refrigeration system (10) includes: a refrigerant circuit (11) performing a vapor compression refrigeration cycle by including a compressor (30), a utilization side heat exchanger (24) configured to allow refrigerant to perform heat exchange with air, and a heat-source side heat exchanger (25) configured to allow refrigerant to perform heat exchange with water; and a casing (14) housing the utilization side heat exchanger (24). The casing (14) contains a power supply (31) including a power semiconductor device and configured to supply electric power to the compressor (30), and also contains a cooler (19) configured to cool the power supply (31) by supplying air to the power supply (31).

5 Claims, 4 Drawing Sheets

REFRIGERATION SYSTEM

CROSS-REFERENCE TO RELATED APPLICATIONS

This application claims the benefit of foreign application JP2007-253962, filed Sep. 28, 2007, and PCT/JP2008/002543, filed Sep. 16, 2008, the entire disclosures of which are incorporated herein.

TECHNICAL FIELD

The present invention relates to refrigeration systems including power supplies for supplying electric power to compressors.

BACKGROUND ART

Refrigeration systems including power supplies (such as inverters) for supplying electric power to compressors are conventionally known. The power supplies include power semiconductor devices which generate large amounts of heat. For example, Patent Document 1 describes an air conditioner in which a power supply is cooled by utilizing air supplied to an outdoor heat exchanger (i.e., a heat-source side heat exchanger) through an outdoor fan.

On the other hand, refrigeration systems in which heat-source side heat exchangers are configured to allow refrigerant to perform heat exchange with water are also conventionally known. For example, Patent Document 2 describes an air conditioner in which a coolant is supplied from a cooling vessel to a heat-source side heat exchanger.

Citation List

Patent Document

PATENT DOCUMENT 1: Japanese Patent Publication No. 2006-226558

PATENT DOCUMENT 2: Japanese Patent Publication No. 2002-333160

SUMMARY OF THE INVENTION

Technical Problem

In a conventional refrigeration system including a power supply, application of a heat exchanger in which refrigerant performs heat exchange with water to a heat-source side heat exchanger eliminates the necessity of using a blower for supplying air to the heat-source side heat exchanger, resulting in that the power supply cannot be cooled.

It is therefore an object of the present invention to provide a refrigeration system in which a heat-source side heat exchanger allows refrigerant to perform heat exchange with water and in which a power supply for supplying electric power to a compressor can be cooled.

Solution to the Problem

A first aspect of the present invention is directed to a refrigeration system (10) including: a refrigerant circuit (11) performing a vapor compression refrigeration cycle by including a compressor (30), a utilization side heat exchanger (24) configured to allow refrigerant to perform heat exchange with air, and a heat-source side heat exchanger (25) configured to allow refrigerant to perform heat exchange with water; and a casing (14) housing the utilization side heat exchanger (24). The casing (14) of this refrigeration system (10) contains a power supply (31) including a power semiconductor device and configured to supply electric power to the compressor (30), and a cooler (19) configured to cool the power supply (31) by supplying air to the power supply (31).

In a second aspect of the present invention, in the refrigeration system (10) of the first aspect, the casing (14) houses a blower (26) configured to supply air to the utilization side heat exchanger (24), and the blower (26) also serves as the cooler (19).

In a third aspect of the present invention, in the refrigeration system (10) of the second aspect, the casing (14) has an inlet opening (15), an outlet opening (16), and an air passageway (21) in which air flows from the inlet opening (15) to the outlet opening (16) and in which the utilization side heat exchanger (24) and the blower (26) are provided, the power supply (31) includes a board (34) on which the power semiconductor device is mounted, and also includes a heat dissipator (32) connected to the board (34) and dissipating heat from the board (34), and only the heat dissipator (32) is exposed to the air passageway (21).

In a fourth aspect of the present invention, in the refrigeration system (10) of the third aspect, the casing (14) includes a board-placement room (18) in which the board (34) is placed, and the board-placement room (18) communicates with the air passageway (21).

In a fifth aspect of the present invention, in the refrigeration system (10) of one of the first through fourth aspects, the heat dissipator (32) is exposed to the air passageway (21) at a position upstream of the utilization side heat exchanger (24).

In a sixth aspect of the present invention, in the refrigeration system (10) of the fifth aspect, the casing (14) includes a board-placement room (18) in which the board (34) is placed, and the board-placement room (18) communicates with the air passageway (21) at a position upstream of the utilization side heat exchanger (24) and the blower (26).

In a seventh aspect of the present invention, in the refrigeration system (10) of the third aspect, the heat dissipator (32) is exposed to the air passageway (21) at a position downstream of the utilization side heat exchanger (24).

In an eighth aspect of the present invention, in the refrigeration system (10) of one of the first through seventh aspects, the casing (14) houses the heat-source side heat exchanger (25) in addition to the utilization side heat exchanger (24), and is placed indoors.

—Operation—

In the first aspect, the casing (14) housing the utilization side heat exchanger (24) contains the power supply (31) and the cooler (19). In this casing (14), the power supply (31) is cooled by supplying air from the cooler (19) to the power supply (31).

In the second aspect, the blower (26) supplying air to the utilization side heat exchanger (24) also serves as the cooler (19). In other words, the cooler (19) is constituted by the blower (26) supplying air to the utilization side heat exchanger (24). In this refrigeration system (10), an air flow caused by the blower (26) causes air to reach not only the utilization side heat exchanger (24) but also the power supply (31).

In the third aspect, only the heat dissipator (32) of the power supply (31) is exposed to the air passageway (21). That is, the board (34) is not exposed to the air passageway (21).

In the fourth aspect, the board-placement room (18) including the board (34) communicates with the air passageway (21). Accordingly, an air flow caused by the blower (26) in the air passageway (21) causes air to reach not only the air passageway (21) but also the board-placement room (18).

In the fifth aspect, the heat dissipator (32) is located upstream of the utilization side heat exchanger (24) in the air passageway (21). Accordingly, air heated by the heat dissipator (32) passes through the utilization side heat exchanger (24).

In the sixth aspect, when the blower (26) is started, air in the board-placement room (18) communicating with a portion upstream of the blower (26) is sucked toward the blower (26). Accordingly, air heated by the board (34) in the board-placement room (18) passes through the utilization side heat exchanger (24).

In the seventh aspect, the heat dissipator (32) is located downstream of the utilization side heat exchanger (24) in the air passageway (21). Accordingly, air which has passed through the utilization side heat exchanger (24) comes into contact with the heat dissipator (32) in the air passageway (21).

In the eighth aspect, the casing (14) houses not only the utilization side heat exchanger (24) but also the heat-source side heat exchanger (25). The power supply (31) is cooled in the casing (14) placed indoors.

Advantages of the Invention

According to the present invention, the power supply (31) and the cooler (19) are provided in the casing (14) housing the utilization side heat exchanger (24), and the power supply (31) is cooled by air supplied from the cooler (19) to the power supply (31). Accordingly, the power supply (31) can be cooled in the refrigeration system (10) in which the heat-source side heat exchanger (25) is configured to allow refrigerant to perform heat exchange with water.

In the second aspect, the blower (26) supplies air not only to the utilization side heat exchanger (24) but also to the power supply (31). Accordingly, a unit for supplying air to the utilization side heat exchanger (24) and a unit for supplying air to the power supply (31) do not need to be provided as separate units. As a result, the configuration of the refrigeration system (10) can be simplified.

In the third aspect, the board (34) of the power supply (31) is not exposed to the air passageway (21). If the board (34) were exposed to the air passageway (21), the board (34) would function as an air resistance in the air passageway (21). In contrast, since the board (34) is not exposed to the air passageway (21) in the third aspect, only the heat dissipator (32) out of the power supply (31) serves as an air resistance. Accordingly, an increase in air resistance can be reduced in the air passageway (21). In addition, it is possible to prevent the board (34) from being damaged by the pressure of air flowing in the air passageway (21).

In the fourth aspect, the board-placement room (18) communicates with the air passageway (21), thereby allowing an air flow caused by the blower (26) in the air passageway (21) to reach not only the air passageway (21) but also the board-placement room (18). Accordingly, not only the heat dissipator (32) in the air passageway (21) but also the board (34) in the board-placement room (18) is cooled. As a result, the power supply (31) can be effectively cooled with the blower (26).

In the fifth aspect, the heat dissipator (32) is exposed to the air passageway (21) at a position upstream of the utilization side heat exchanger (24), thereby causing air heated by the heat dissipator (32) to pass through the utilization side heat exchanger (24). Accordingly, when the utilization side heat exchanger (24) serves as an evaporator, air heated by the heat dissipator (32) is cooled in the utilization side heat exchanger (24). Thus, air heated by the heat dissipator (32) cannot be discharged from the casing (14) without any treatment.

In the sixth aspect, the board-placement room (18) communicates with the air passageway (21) at a position upstream of the utilization side heat exchanger (24) and the blower (26), thereby allowing air heated by the board (34) in the board-placement room (18) to pass through the utilization side heat exchanger (24). Accordingly, when the utilization side heat exchanger (24) serves as an evaporator, air heated by the board (34) is cooled in the utilization side heat exchanger (24). Thus, air heated by the board (34) cannot be discharged from the casing (14) without any treatment.

In the seventh aspect, the heat dissipator (32) is exposed to the air passageway (21) at a position downstream of the utilization side heat exchanger (24), thereby allowing air which has passed through the utilization side heat exchanger (24) to come into contact with the heat dissipater (32). Accordingly, when the utilization side heat exchanger (24) serves as an evaporator, air cooled by the utilization side heat exchanger (24) comes into contact with the heat dissipator (32), thereby effectively cooling the heat dissipator (32).

In the eighth aspect, the power supply (31) is cooled in the casing (14) placed indoors. In the United States, for example, however, a refrigeration system (10) in which a casing (14) housing a utilization side heat exchanger (24) and a heat-source side heat exchanger (25) is placed indoors is often used. On the other hand, power supply (31) such as inverters are generally placed outdoors together with compressors (30). Since such a refrigeration system (10) as used in the United States does not include a heat exchanger placed outdoors, the power supply (31) cannot be cooled. In contrast, in the eighth aspect, the cooler (19) is placed in the indoor casing (14). Accordingly, the power supply (31) can be appropriately cooled.

Figure 1:
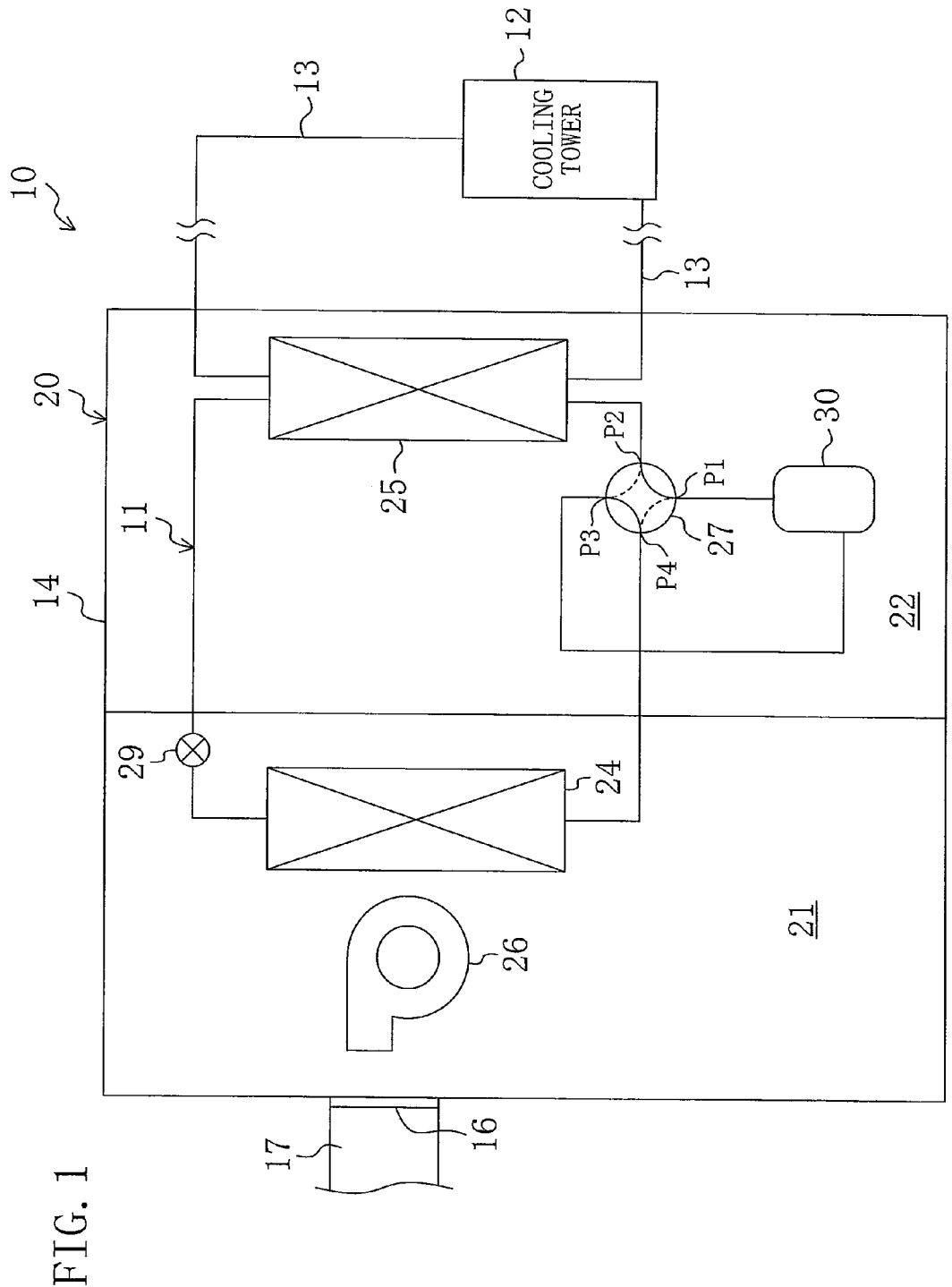
FIG. 1 is a view schematically illustrating a configuration of an air conditioner according to an embodiment of the present invention.

DESCRIPTION OF REFERENCE CHARACTERS 10 air conditioner (refrigeration system)
11 refrigerant circuit
14 casing
15 inlet opening
16 outlet opening
18 board-placement room
19 cooler
21 air passageway
24 utilization side heat exchanger
25 heat-source side heat exchanger
26 blower
30 compressor 31 inverter (power supply)
32 heat sink (heat dissipator)
34 mounting board (board)

DESCRIPTION OF EMBODIMENTS

An embodiments of the present invention will be described in detail hereinafter with reference to the drawings.

This embodiment is directed to an air conditioner (10) configured as a refrigeration system (10) according to the present invention. As illustrated in FIG. 1, this air conditioner (10) includes a main unit (20) and a cooling tower (12). The main unit (20) is placed on, for example, a ceiling of a room in a house. The cooling tower (12) is placed outdoors. The main unit (20) and the cooling tower (12) are connected together through two water pipes (13). One of the water pipes (13) is provided with a water pump (not shown) for supplying water in the cooling tower (12) to the main unit (20).

Figure 2:
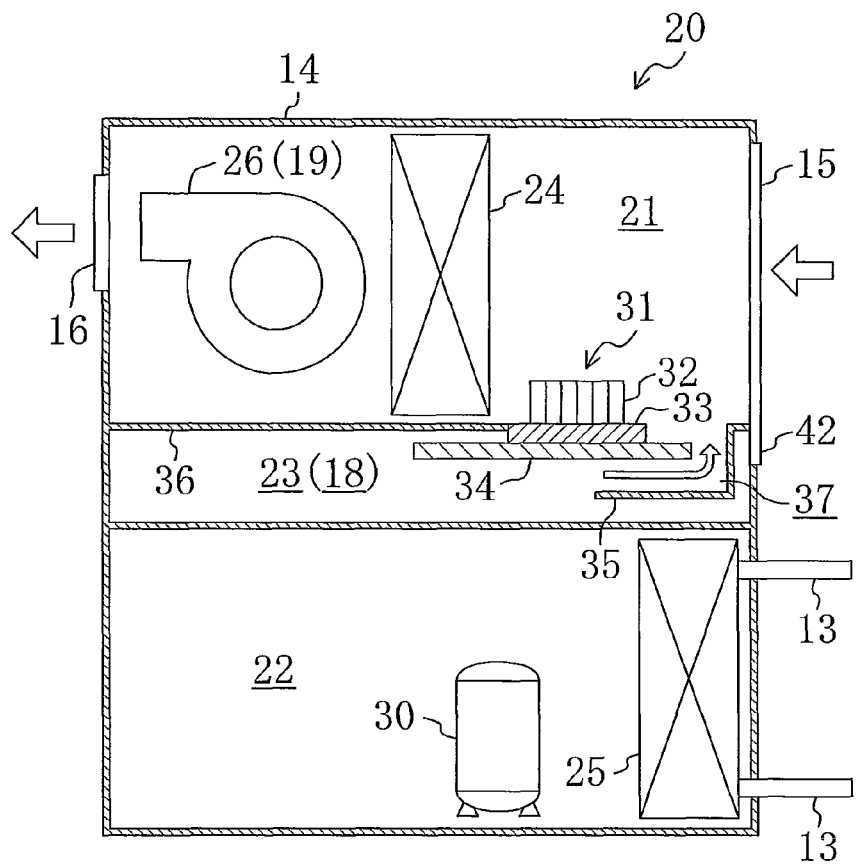
FIG. 2 is a cross-sectional view schematically illustrating a main unit of the air conditioner of the embodiment.

The main unit (20) includes a box-like casing (14). As illustrated in FIGS. 1 and 2, the casing (14) includes: a refrigerant circuit (11); a blower (26) for supplying air to a utilization side heat exchanger (24); and an inverter (31) for supplying electric power to a compressor (30). The refrigerant circuit (11) includes the compressor (30), the utilization side heat exchanger (24), a heat-source side heat exchanger (25), an expansion valve (29), a four-way selector valve (27). The air conditioner (10) is configured as a single-unit refrigeration system in which the utilization side heat exchanger (24) and the heat-source side heat exchanger (25) are provided in the same casing (14).

As illustrated in FIG. 1, the internal space of the casing (14) is divided into an air passageway (21) and a machinery room (22). As illustrated in FIG. 2, the air passageway (21) has an inlet opening (15) and an outlet opening (16). The outlet opening (16) is connected to a duct (17) which is connected to a plurality of interior spaces. In the casing (14), an electric room (23) is formed adjacent to the air passageway (21). It should be noted that the electric room (23) is not shown in FIG. 1.

As illustrated in FIG. 1, the air passageway (21) is provided with the utilization side heat exchanger (24), the blower (26), and the expansion valve (29). In this air passageway (21), air taken by the blower (26) through the inlet opening (15) flows toward the outlet opening (16). As illustrated in FIG. 2, the utilization side heat exchanger (24) is located upstream of the blower (26) in the air passageway (21). On the other hand, the machinery room (22) is provided with the compressor (30), the heat-source side heat exchanger (25), and the four-way selector valve (27). The refrigerant circuit (11) extends across the boundary between the air passageway (21) and the machinery room (22).

In the refrigerant circuit (11), the discharge side of the compressor (30) is connected to a first port (P1) of the four-way selector valve (27). The suction side of the compressor (30) is connected to a third port (P3) of the four-way selector valve (27). The heat-source side heat exchanger (25) is connected to a second port (P2) of the four-way selector valve (27) at one end, and is connected to the expansion valve (29) at the other end. The utilization side heat exchanger (24) is connected to a fourth port (P4) of the four-way selector valve (27) at one end, and is connected to the expansion valve (29) at the other end.

The compressor (30) is a so-called inverter compressor. The operation capacity of the compressor (30) is adjusted stepwise by changing the output frequency of the inverter (31). The operation capacity of the compressor (30) is adjustable in a plurality of steps (e.g., 20 steps). The expansion valve (29) is, for example, either an electronic expansion valve whose opening degree is adjustable or a temperature-sensitive expansion valve.

The utilization side heat exchanger (24) is, for example, a heat exchanger (e.g., a fin-and-tube heat exchanger of a cross-fin type) in which refrigerant performs heat exchange with air. In the utilization side heat exchanger (24), heat exchange is performed between air from the blower (26) and the refrigerant. On the other hand, the heat-source side heat exchanger (25) is, for example, a heat exchanger (e.g., a shell-and-tube heat exchanger) in which refrigerant performs heat exchange with water. The heat-source side heat exchanger (25) is connected to the two water pipes (13) extending from the cooling tower (12). In the heat-source side heat exchanger (25), heat exchange is performed between water from the cooling tower (12) and the refrigerant.

The four-way selector valve (27) can switch between a first state (indicated by solid lines in FIG. 1) in which the first port (P1) and the second port (P2) communicate with each other and the third port (P3) and the fourth port (P4) communicate with each other, and a second state (indicated by broken lines in FIG. 1) in which the first port (P1) and the fourth port (P4) communicate with each other and the second port (P2) and the third port (P3) communicate with each other.

The inverter (31) is a power supply. The inverter (31) is electrically connected to a motor in the compressor (30). The inverter (31) includes a mounting board (34) serving as a board, and a heat sink (32) serving as a heat dissipater. A power semiconductor device such as a switching device is mounted on the front surface of the mounting board (34). The heat sink (32) is connected to the back surface of the mounting board (34). The heat sink (32) penetrates through a plate member (33) which will be described later.

The inverter (31) is attached to a separator (36) which separates the air passageway (21) and the electric room (23) from each other, with the insulating plate member (33) interposed therebetween. The insulating plate member (33) is placed on the back surface of the mounting board (34). The inverter (31) is provided such that only the heat sink (32) is exposed to the air passageway (21). The heat sink (32) is exposed to the air passageway (21) at a position upstream of the utilization side heat exchanger (24). The mounting board (34) is exposed to the electric room (23). In this embodiment, the electric room (23) is a board-placement room (18).

The electric room (23) communicates with the air passageway (21) at a position upstream of the utilization side heat exchanger (24) through an opening formed in the separator (36). The electric room (23) has a cooling inlet opening (42) through which outside air is taken to cool the inverter (31). In the electric room (23), an air guide passageway (37) for guiding air in the electric room (23) to the air passageway (21) is formed by a guide plate (35) extending from a portion surrounding the opening in the separator (36) to the electric room (23). In the air guide passageway (37), inflow air comes into contact with the mounting board (34), before flowing into the air passageway (21).

In this air conditioner (10), when the blower (26) is started, air is caused to flow from the inlet opening (15) to the outlet opening (16) in the air passageway (21), and air in the electric room (23) is sucked by the blower (26), thereby causing air to flow from the electric room (23) into the air passageway (21) through the air guide passageway (37). In the air passageway (21), the heat sink (32) is cooled by air flowing from the inlet opening (15) to the utilization side heat exchanger (24). In the electric room (23), the mounting board (34) is cooled by air flowing from the cooling inlet opening (42) to the air passageway (21). In this air conditioner (10), the blower (26) is a cooler (19) configured to cool the inverter (31). The cooling of the heat sink (32) is performed by utilizing a negative pressure of the blower (26).

—Operational Behavior—

This air conditioner (10) selectively performs heating operation and cooling operation as air conditioning operation. In this air conditioner (10), air subjected to temperature control in the utilization side heat exchanger (24) during air conditioning operation is supplied to a plurality of interior spaces through the duct (17).

In the cooling operation, the four-way selector valve (27) is set in the first state. In the refrigerant circuit (11) during the cooling operation, the heat-source side heat exchanger (25) operates as a condenser (i.e., a heat dissipater), and the utilization side heat exchanger (24) operates as an evaporator, thereby performing a vapor compression refrigeration cycle. Water cooled by outdoor air in the cooling tower (12) is supplied to the heat-source side heat exchanger (25).

On the other hand, in the heating operation, the four-way selector valve (27) is set in the second state. In the refrigerant circuit (11) during the heating operation, the utilization side heat exchanger (24) operates as a condenser (i.e., a heat dissipater), and the heat-source side heat exchanger (25) operates as an evaporator, thereby performing a vapor compression refrigeration cycle. Water heated by outdoor air in the cooling tower (12) is supplied to the heat-source side heat exchanger (25).

In this air conditioner (10), the blower (26) is operated during the air conditioning operation. In this state, air flows from the inlet opening (15) to the outlet opening (16) in the air passageway (21). In the electric room (23), air taken through the cooling inlet opening (42) flows into the air passageway (21) through the air guide passageway (37). In this embodiment, an air flow caused by the blower (26) in the air passageway (21) causes air to reach not only the air passageway (21) but also the electric room (23). In the air passageway (21), the heat sink (32) is cooled by air flowing from the inlet opening (15) to the utilization side heat exchanger (24). On the other hand, in the electric room (23), the mounting board (34) is cooled by air flowing from the cooling inlet opening (42) to the air passageway (21). Air heated by the mounting board (34) flows into the air passageway (21) through the opening in the separator (36). Air heated by the mounting board (34) and the heat sink (32) passes through the utilization side heat exchanger (24), and then flows through the outlet opening (16).

—Advantages of Embodiment—

In this embodiment, the inverter (31) and the cooler (19) are provided in the casing (14) housing the utilization side heat exchanger (24), and the inverter (31) is cooled by air supplied from the cooler (19) to the inverter (31). Accordingly, the inverter (31) can be cooled in the refrigeration system (10) in which the heat-source side heat exchanger (25) is configured to allow refrigerant to perform heat exchange with water.

In addition, in this embodiment, the blower (26) also serves as the cooler (19). Accordingly, a unit for supplying air to the utilization side heat exchanger (24) and a unit for supplying air to the inverter (31) do not need to be provided as separate units, thereby simplifying the configuration of the refrigeration system (10). Further, power consumption necessary for cooling of the inverter (31) does not increase.

Further, in this embodiment, the mounting board (34) of the inverter (31) is not exposed to the air passageway (21). If the mounting board (34) were exposed to the air passageway (21), the mounting board (34) would function as an air resistance in the air passageway (21). In this embodiment, to prevent this problem, the mounting board (34) is not exposed to the air passageway (21), and thus, only the heat sink (32) out of the inverter (31) serves as an air resistance. Accordingly, an increase in air resistance can be reduced in the air passageway (21). In addition, it is possible to prevent the mounting board (34) from being damaged by the pressure of air flowing in the air passageway (21).

Moreover, in this embodiment, the electric room (23) serving as the board-placement room (18) communicates with the air passageway (21), thereby allowing an air flow caused by the blower (26) in the air passageway (21) to reach not only the air passageway (21) but also the electric room (23). Accordingly, not only the heat sink (32) in the air passageway (21) but also the mounting board (34) in the electric room (23) can be cooled. As a result, the inverter (31) can be effectively cooled with the blower (26).

Furthermore, in this embodiment, the heat sink (32) is exposed to the air passageway (21) at a position upstream of the utilization side heat exchanger (24), thereby causing air heated by the heat sink (32) to pass through the utilization side heat exchanger (24). Accordingly, when the utilization side heat exchanger (24) serves as an evaporator, air heated by the heat sink (32) is cooled in the utilization side heat exchanger (24). Thus, air heated by the heat sink (32) cannot be supplied to the interior spaces from the casing (14) without any treatment.

In addition, in this embodiment, the electric room (23) serving as the board-placement room (18) communicates with the air passageway (21) at a position upstream of the utilization side heat exchanger (24) and the blower (26), thereby allowing air heated by the mounting board (34) in the electric room (23) to pass through the utilization side heat exchanger (24). Accordingly, when the utilization side heat exchanger (24) serves as an evaporator, air heated by the mounting board (34) is cooled in the utilization side heat exchanger (24). Thus, air heated by the mounting board (34) cannot be supplied to the interior spaces from the casing (14) without any treatment.

Further, in this embodiment, the inverter (31) is cooled in the casing (14) which is placed indoors. In the United States, for example, however, a refrigeration system (10) in which a casing (14) housing a utilization side heat exchanger (24) and a heat-source side heat exchanger (25) is placed indoors is often used. On the other hand, inverters (31), for example, are generally placed outdoors together with compressors (30). Since such a refrigeration system (10) as used in the United States does not include a heat exchanger placed outdoors, the inverter (31) cannot be cooled. In contrast, in this embodiment, the cooler (19) is provided in the indoor casing (14). Accordingly, the inverter (31) can be appropriately cooled.

—Variation 1 of Embodiment—

Figure 3:
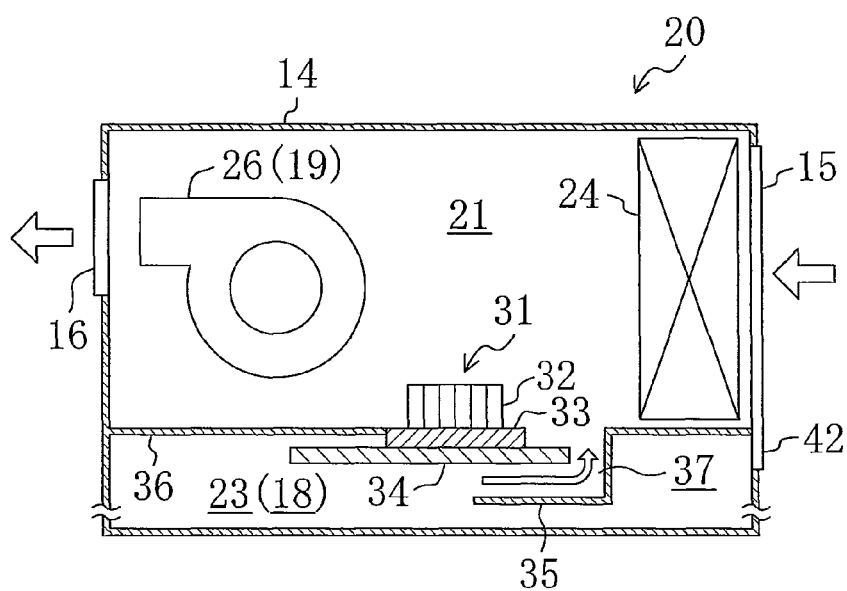
FIG. 3 is a cross-sectional view schematically illustrating a main unit of an air conditioner according to a first variation of the embodiment.

A first variation of the embodiment will be described hereinafter. In this first variation, as illustrated in FIG. 3, the heat sink (32) is exposed to the air passageway (21) at a position between the utilization side heat exchanger (24) and the blower (26). The heat sink (32) is exposed at a position downstream of the utilization side heat exchanger (24). With this configuration, air which has passed through the utilization side heat exchanger (24) comes into contact with the heat sink (32) in the air passageway (21). The electric room (23) communicates with the air passageway (21) at a position between the utilization side heat exchanger (24) and the blower (26).

In the first variation, air cooled in the utilization side heat exchanger (24) comes into contact with the heat sink (32) during cooling operation in which the utilization side heat exchanger (24) serves as an evaporator. Accordingly, the heat sink (32) can be effectively cooled in the cooling operation.

—Variation 2 of Embodiment—

Figure 4:
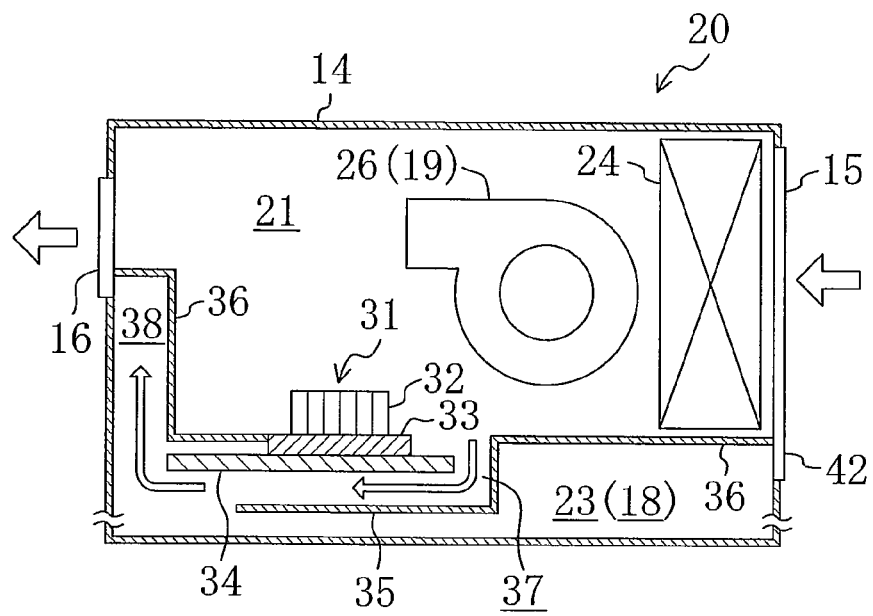
FIG. 4 is a cross-sectional view schematically illustrating a main unit of an air conditioner according to a second variation of the embodiment.

A second variation of the embodiment will be described hereinafter. In this second variation, as illustrated in FIG. 4, the heat sink (32) is exposed to the air passageway (21) at a position downstream of the blower (26). The electric room (23) communicates with the air passageway (21) at a position downstream of the blower (26). In the casing (14), the separator (36) forms a discharge passageway (38) connecting the electric room (23) and the outlet opening (16) together.

In the second variation, air blown from the blower (26) comes into contact with the heat sink (32) to cool the heat sink (32). In other words, the heat sink (32) is cooled by utilizing a positive pressure of the blower (26). Part of the air from the blower (26) flows into the air guide passageway (37) to cool the mounting board (34) in the air guide passageway (37) and the electric room (23). Air heated by the mounting board (34) is guided to the outlet opening (16) through the discharge passageway (38). Air which has passed through the air passageway (21) and air which has passed through the discharge passageway (38) are discharged through the outlet opening (16).

—Variation 3 of Embodiment—

Figure 5:
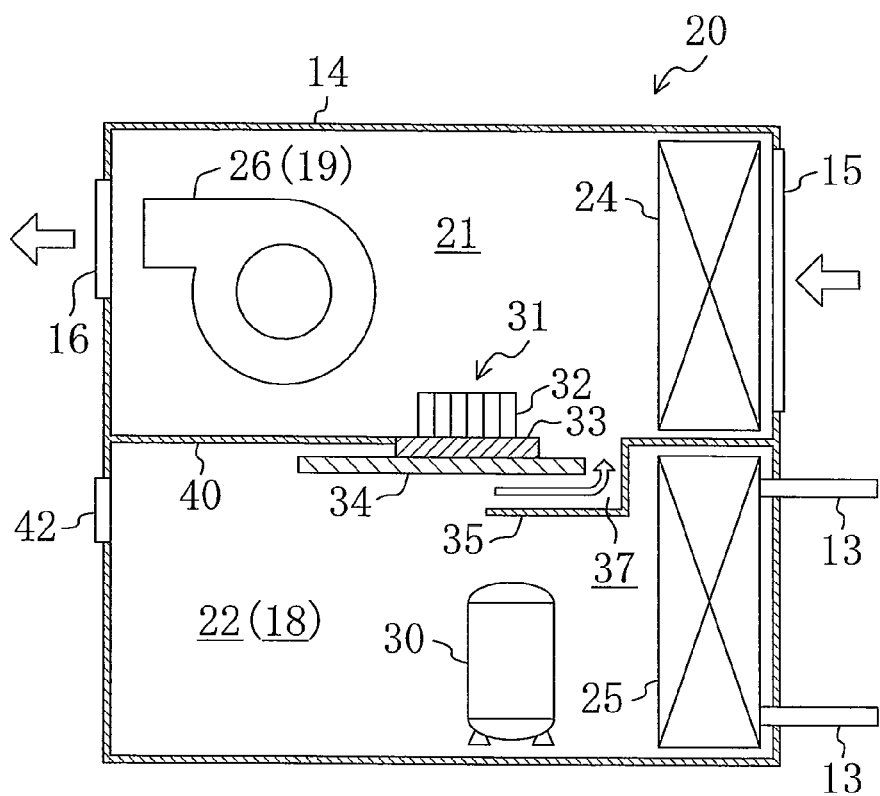
FIG. 5 is a cross-sectional view schematically illustrating a main unit of an air conditioner according to a third variation of the embodiment.

A third variation of the embodiment will be described hereinafter. In this third variation, as illustrated in FIG. 5, the mounting board (34) is exposed to the machinery room (22). The machinery room (22) is a board-placement room (18). The machinery room (22) has the cooling inlet opening (42) for taking outside air to cool the inverter (31). In the third variation, no electric room (23) is provided.

—Variation 4 of Embodiment—

Figure 6:
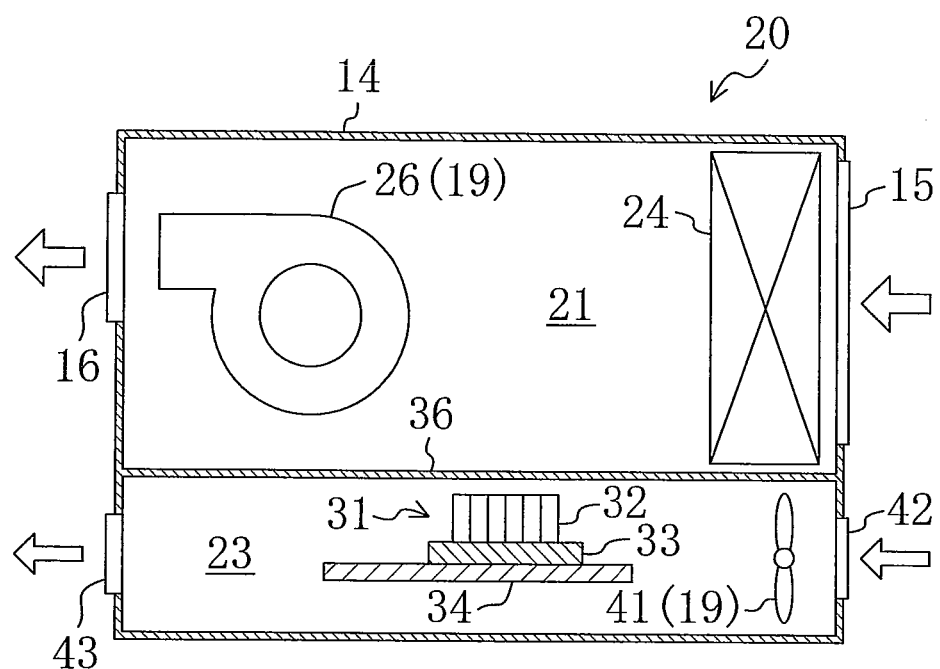
FIG. 6 is a cross-sectional view schematically illustrating a main unit of an air conditioner according to a fourth variation of the embodiment.

A fourth variation of the embodiment will be described hereinafter. In this fourth variation, as illustrated in FIG. 6, the entire inverter (31) is located in the electric room (23). The electric room (23) is provided with a cooling fan (41) serving as a cooler. The electric room (23) has the cooling inlet opening (42) and a cooling outlet opening (43).

In the fourth variation, the entire inverter (31) is cooled with air taken by a cooling fan (41) through the cooling inlet opening (42). Air heated by the inverter (31) is discharged through the cooling outlet opening (43).

<<Other Embodiments>>

The foregoing embodiment may be changed in the manner as described in the following variations.

The refrigeration system (10) of the above embodiment may be a refrigeration system except for an air conditioner.

The refrigeration system (10) of the above embodiment may be a refrigeration system of a separate type in which a utilization unit housing the utilization side heat exchanger (24) and a heat source unit housing the heat-source side heat exchanger (25) are provided as separate units.

In the refrigeration system (10) of the above embodiment, cooling or heating of water to be supplied to the heat-source side heat exchanger (25) may be performed by utilizing geothermal heat. In this case, the water pipes (13) connected to the heat-source side heat exchanger (25) are partially buried in the ground.

In the above embodiment, the entire inverter (31) may be provided in the air passageway (21).

The foregoing embodiments are only preferred examples in nature, and are not intended to limit the scope, applications, and use of the invention.

Industrial Applicability

As described above, the present invention is useful for refrigeration systems including power supplies for supplying electric power to compressors.

The invention claimed is:

1. A refrigeration system, comprising:
   a refrigerant circuit performing a vapor compression refrigeration cycle by including a compressor, a utilization side heat exchanger configured to allow refrigerant to perform heat exchange with air, and a heat-source side heat exchanger configured to allow refrigerant to perform heat exchange with water; and
   a casing housing the utilization side heat exchanger, wherein the casing contains
      a power supply including a power semiconductor device and configured to supply electric power to the compressor, and
      a cooler configured to cool the power supply by supplying air to the power supply, wherein
   the casing houses a blower configured to supply air to the utilization side heat exchanger,
   the blower also serves as the cooler,
   the casing has an inlet opening, an outlet opening, and an air passageway in which air flows from the inlet opening to the outlet opening and in which the utilization side heat exchanger and the blower are provided,
   the power supply includes a board on which the power semiconductor device is mounted, and also includes a heat dissipator connected to the board and dissipating heat from the board,
   only the heat dissipator is exposed to the air passageway,
   the casing includes a board-placement room in which the board is placed,
   the board-placement room is separated from the air passageway by a separator having an opening and communicates with the air passageway through the opening of the separator,
   the outlet opening is connected to a duct connected to a plurality of interior spaces, and
   the blower is configured to cool the heat dissipator by causing an air flow in the air passageway and cool the board by causing air to flow into the board-placement room by the air flow.

2. The refrigeration system of claim 1, wherein the heat dissipator is exposed to the air passageway at a position upstream of the utilization side heat exchanger.

3. The refrigeration system of claim 1, wherein
   the board-placement room communicates with the air passageway at a position upstream of the utilization side heat exchanger and the blower.

4. The refrigeration system of claim 1, wherein
   the heat dissipator is exposed to the air passageway at a position downstream of the utilization side heat exchanger.

5. The refrigeration system of one of claims 1, 2, 3, or 4, wherein the casing houses the heat-source side heat exchanger in addition to the utilization side heat exchanger, and is placed indoors.

* * * * *